United States Patent [19]

Cameron et al.

[11] Patent Number: 4,867,260

[45] Date of Patent: Sep. 19, 1989

[54] ALL-WHEEL DRIVE VEHICLE POWER TRAIN

[75] Inventors: Dugald Cameron, Grosse Pointe Woods, Mich.; Karl Friedrich, Leibnitz, Austria; Rudolf Zmugg; Peter Resele, both of Graz, Austria

[73] Assignee: Chrysler Motors Corporation, Highland Park, Mich.

[21] Appl. No.: 266,462

[22] Filed: Nov. 2, 1988

[30] Foreign Application Priority Data

Dec. 15, 1987 [AT] Austria .................................. 3296/87

[51] Int. Cl.$^4$ ........................ B60K 17/35; B60K 23/04
[52] U.S. Cl. .................................... 180/360; 180/233; 180/248; 180/249; 180/380
[58] Field of Search .............. 180/248, 249, 233, 73.1, 180/75.1, 75.2, 88; 248/635, 634

[56] References Cited

U.S. PATENT DOCUMENTS

| | | | |
|---|---|---|---|
| 3,232,384 | 2/1966 | Esser et al. | 180/73.1 X |
| 3,760,922 | 9/1973 | Rolt et al. | 180/248 X |
| 4,031,780 | 6/1977 | Dolan et al. | 180/248 X |
| 4,141,428 | 2/1979 | Loeb | 180/75.2 |
| 4,605,087 | 8/1986 | Ashauer et al. | 180/248 |
| 4,699,230 | 10/1987 | Solleder et al. | 180/73.1 |

OTHER PUBLICATIONS

VW Golf Syncro, VISCODRIVE.

Primary Examiner—Mitchell J. Hill
Attorney, Agent, or Firm—Edward P. Barthel

[57] ABSTRACT

A drive line assembly and mounting arrangement for converting a front engine front wheel drive vehicle to an on-demand four wheel drive system. The vehicle rear axle is adapted to be selectively driven by means of a viscous fluid coupling positioned intermediate a forward angled universal-joint drive line assembly and a rear torque tube enclosed longitudinal propeller shaft assembly. An overrunning clutch is rigidly connected intermediate a forwardly extending neck portion of the rear axle drive housing and the torque tube defines a composite torque tube structure. The overrunning clutch is adapted to be locked for a transmission of torque during normal driving. The rear axle drive housing is sprung from the frame by a pair of transversely aligned isolation mounts while the composite torque tube is resiliently secured by a bracket support adjacent its forward end. The composite torque tube provides an extended lever arm of a predetermined length that oscillates in a vertical plane about the transverse axis of the pair of rear mounts whereby the reaction torque vibrations from the rear axle drive imparted to the forward resilient bracket support are effectively dampened.

1 Claim, 3 Drawing Sheets

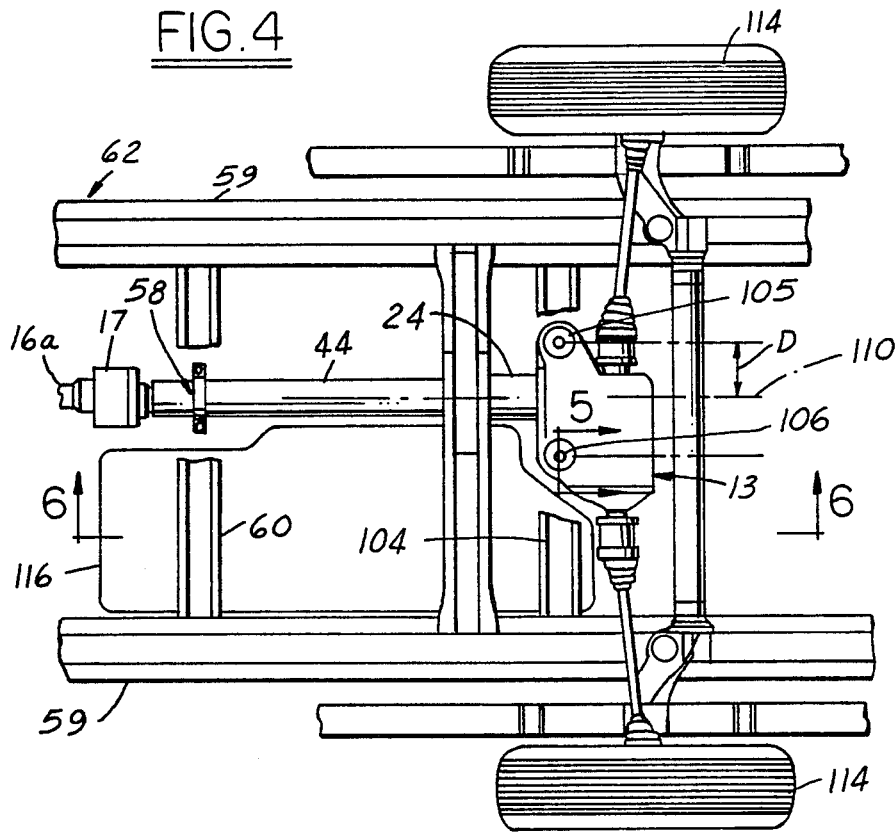
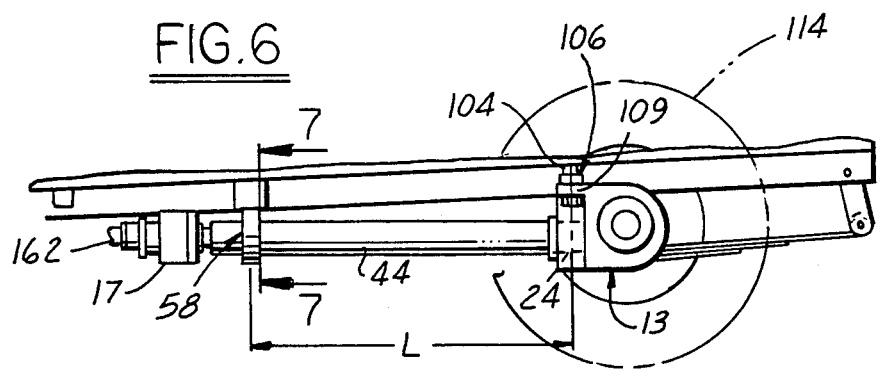
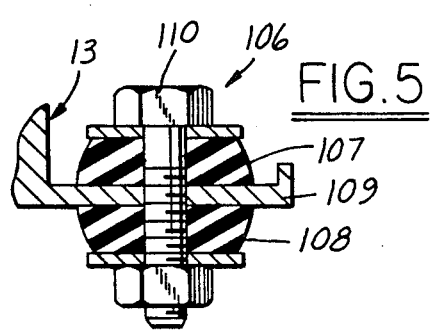
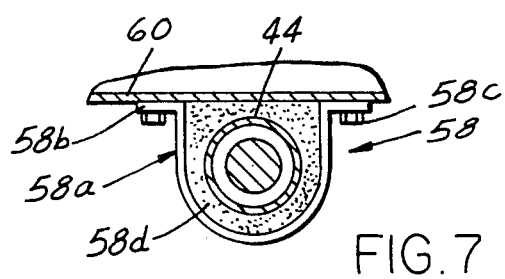

ALL-WHEEL DRIVE VEHICLE POWER TRAIN

BACKGROUND OF THE INVENTION

This invention relates to all-wheel drive systems for motor vehicles and, more particularly to an improved arrangement for accommodating a controllable freewheeling clutch in a housing which is rigid with both the housing of the vehicle rear axle drive and the propeller shaft torque tube.

The U.S. Pat. No. 4,605,087 issued Aug. 12, 1986, to Ashauer et al. discloses an all-wheel drive system for vehicles wherein the front and rear driving wheels are connected permanently by a drive train between the front transaxle and the rear driven axle. A freewheeling or overrunning clutch device is provided in the driveline for uncoupling the drive train in accordance with the applied torque. Thus, a decrease in the rotational speed of the front wheels can not be transmitted to the rear wheels through the driving connection between them. Accordingly, when the primary or foot brake is actuated with a rigid coupling between the front and rear wheels, the overrunning clutch system responds to the braking action on the front wheels uncoupling the rear wheels whereby any overbraking of the front wheels can not be transmitted to the rear wheels through the drive train.

The Ashauer drive train further provides a liquid friction or viscous coupling connection located at the input end of the rear axle differential for transmitting variable torques depending upon the speed differentials between the input and output shafts of the drive train. Thus, when the directly driven front wheels and rear wheels rotational speed is about equal the viscous coupling will transmit practically no torque allowing the rear wheels to follow the front wheels with no significant driving action. When front wheel speed exceeds the rear wheel speed, such as "wheel slip" caused by wet, snow-covered or icy roads, the viscous coupling will react and produce a rising high torque transfer connection between the drive train input and output shafts.

In one embodiment of Ashauer the rear differential housing includes a rigid longitudinal tube portion adjoining the liquid friction coupling. The tube portion, however, is relatively short and is secured to the frame at a location which is spaced a relatively small distance in front of the axis of the rear axle drive such that objectional rear axle drive torque reaction forces are imparted to the vehicle body.

The Ashauer patent discloses an overrunning clutch directly connected to the housing of the front axle drive with resultant engine vibrations being transmitted via the front axle drive to the clutch housing. This arrangement creates vibrations which may interfere with the actuating means for locking the overrunning clutch. In addition it may be impractical to arrange the overrunning clutch close to the front axle drive. This is particularly true in vehicles that have originally been designed for a front wheel drive transaxle and subsequently are converted to an all-wheel drive mode.

A four-wheel drive system is provided in the VW "Golf Syncro" automobile which has a transverse front engine that requires a bevel drive to the longitudinal propeller shaft. The rear axle differential has a transmission ratio of almost 1, meaning that the speed of the longitudinal shaft as almost equal to that of the half shafts. Drive into the rear axle is achieved by bevel gears. The Golf Syncro has no central differential but rather a viscous coupling flange-mounted on the rear axle differential that provides a permanent, variable four-wheel drive known as "Viscous Transmission". A free-wheel or overrunning clutch is housed in the rear axle that provides complete disconnection of the rear axle in overrun condition and when breaking. An electropneumatic system automatically locks the overrunning clutch when reverse gear is selected, meaning that the four-wheel drive is also available for reversing.

SUMMARY OF THE INVENTION

It is an object of the present invention to provide a rear axle drive line structural mounting arrangement comprising an overrunning clutch and a viscous coupling adapted for converting a front wheel drive motor vehicle into an all-wheel drive system wherein the magnitude of the road induced vibrations and drive torque reactions imparted to the vehicle rear axle drive line are attenuated by virtue of a unique torque transmitting drive line housing structural assembly and resilient isolation chassis mounting arrangement therefore.

It is another object of the present invention to provide a rear axle drive line arrangement as set forth above wherein the overrunning clutch is required to transmit relatively low torques.

It is still another object of the present invention to provide a rear axle drive line arrangment as set forth above wherein the viscous coupling is arranged in a compact easily serviced manner.

The present invention as set forth above comprises a vehicle having front and rear axles with front engine-front wheel drive transaxle which is adapted to provide an on-demand four wheel drive system. The drive train includes a propeller shaft incorporating both a viscous liquid friction coupling and an overrunning clutch. The overrunning clutch is adapted to be locked for the transmission of torque during normal driving and unlocked upon braking to prevent a decrease in the rotational speed of the vehicle front wheels from being transmitted to the rear wheels through the drive line connection therebetween.

The rear axle is provided with an angle drive and a differential contained in a common housing. A rearward portion of the longitudinal propeller shaft assembly is accommodated in an extended composite torque tube the aft end of which is rigidly secured to the front end of the overrunning clutch housing. The overrunning clutch housing thus becomes a fixed rearward extension of the composite torque tube enabling its aft end to be fixedly connected to a forwardly extending neck portion of the rear axle drive housing.

The rear axle drive housing is resiliently sprung from the underside of the vehicle frame by a pair of transversely spaced resilient rear isolation mounts. A single resilient forward isolation bracket supports the front end of the composite torque tube to a frame crossbeam at a predetermined distance forward of the pair of rear mounts. By virtue of the unique structure of the present invention by rear axle drive housing and composite torque tube assembly are resiliently sprung from the frame at fore and aft locations spaced apart by a distance which is at least about one-quarter the dimension of the vehicle wheelbase. In this way the reaction torque of the prop shaft rear pinion gear as applied to the forward support bracket is substantially reduced by means of the lever arm effect of the extended composite torque tube. A more resilient forward bracket is achieved by the present design thereby lowering the ride frequency.

In accordance with the invention the overrunning clutch is accommodated in an oil-tight clutch housing which provides a rigid forward extension of the rear axle drive housing neck portion. The longitudinal torque tube extends forwardly of and is flanged to the overrunning clutch housing such that they are rigidly aligned on their principal axes. The composite torque tube front end portion is sprung from the chassis by an isolation hanger bracket having a rubber-like isolation collar surrounding the torque tube. The bracket is fixed to a crossbeam of the vehicle frame while the viscous coupling housing is journalled on a portion of the propeller shaft adjacent the front end of the composite torque tube.

In this way the rear axle drive housing and composite torque tube are supported in an isolated manner on the frame. Consequently road vibrations, bumps, and rear axle torque imparted to the rear axle drive housing via the rear wheels will be dampened by the pair of rear isolation mounts and the front single isolation mount by virtue of their separation by a relatively long lever arm. As a result only relatively small forces will be exerted on the vehicle frame by the road induced vibrations and rear axle drive torques.

As the overrunning clutch is disposed close to the rear axle drive, it is sufficient to design the clutch for a transmission subjected to relatively small forces. Because the overrunning clutch is accommodated in a separate, oil-tight housing, specific suitable lubricants may be used for the rear axle housing and for the clutch. Besides, the overrunning clutch will have a somewhat reduced tendency to vibrate as compared to a clutch that is rigidly connected to the engine unit. Thus, the means for locking the clutch can be actuated without difficulty. As the viscous coupling is disposed forward of the composite torque tube the diameter of the coupling can easily be selected compatible with the torques which are to be transmitted. Further, the viscous coupling is disposed in the open air so that an effective dissipation of heat generated during viscous shear will be ensured.

It is another feature of the invention to provide a drive train arrangement for an all-wheel drive vehicle as set forth above which is simple in construction and can be readily manufactured wherein the universal-joint propeller shaft forward portion is directly flange-mounted to the housing of the liquid friction viscous coupling.

BRIEF DESCRIPTION OF THE DRAWINGS

These and other objects, features and advantages of the present invention will appear from the following written description and the accompanying drawings in which:

FIG. 4 is a fragmentary top elevational view with parts broken away showing a preferred version of the rear half portion of the vehicle of FIG. 1;

FIG. 5 is an enlarged vertical sectional view taken substantially on the line 5—5 of FIG. 4;

FIG. 6 is a fragmentary vertical sectional view taken substantially on the line 6—6 of FIG. 4; and FIG. 7 is an enlarged fragmentary vertical sectional view taken substantially on the line 7—7 of FIG. 6.

DETAILED DESCRIPTION OF THE PREFERRED EMBODIMENT

Figure 1:
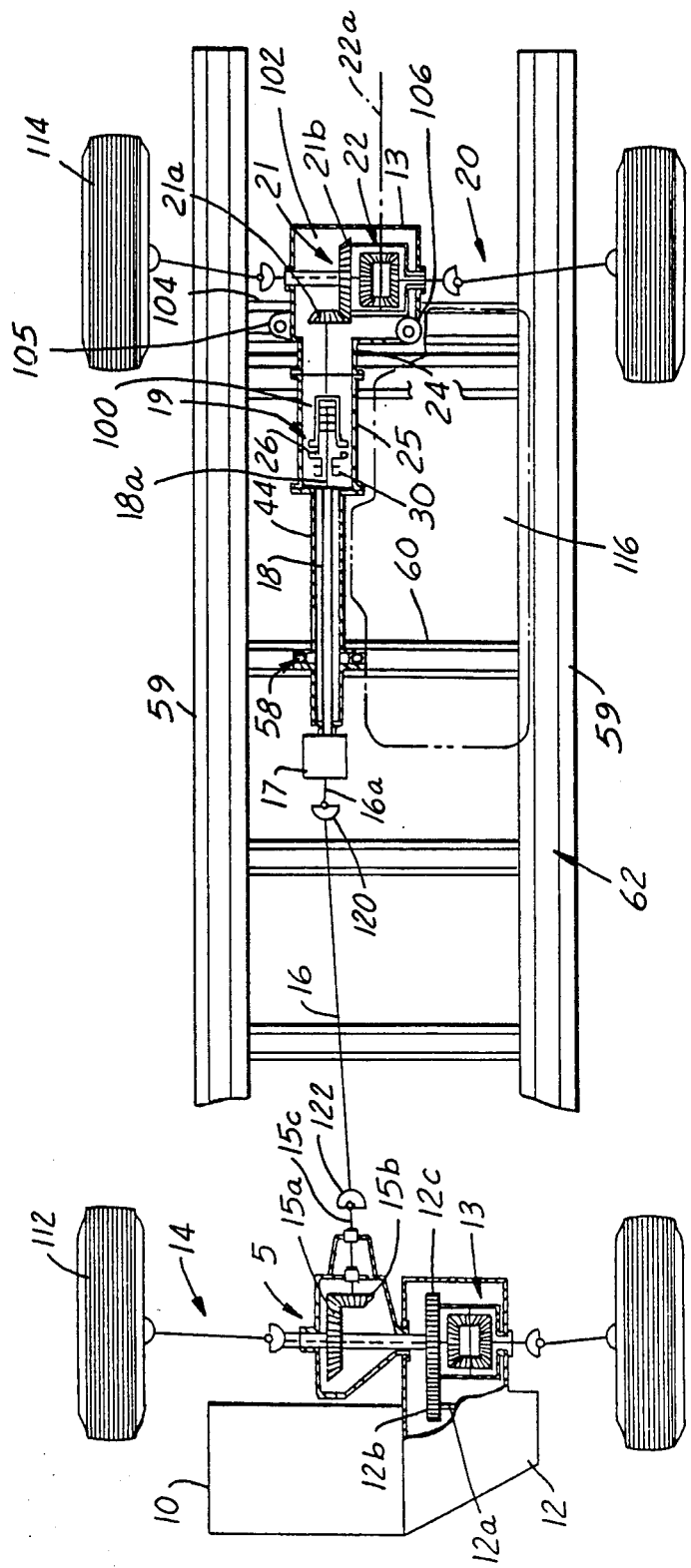
FIG. 1 is a diagrammatic representation of the entire drive system of a motor vehicle incorporating a preferred embodiment of the present invention.

Turning now to the drawings and more particularly to FIG. 1, an illustrative embodiment of the invention is shown in the diagrammatic view of a motor vehicle including a transversely mounted front engine 10 and a transversely aligned manual or automatic transaxle power transmission unit 12.

An output transfer shaft 12a of the transmission has an output gear 12b shown meshing with an input gear ring 12c of an interaxle differential, generally indicated at 13 of, the vehicle transaxle.

The motor vehicle in accordance with the invention further comprises a front axle assembly 14, which is constantly driven from the engine 10 via the shiftable transmission power unit 12 and the front axle differential 13. A front right-angle drive 15, which comprises an input bevel gear 15a and an output bevel gear 15b, is shown drivingly connected by gear shaft 15c to a universal-joint angled forward propeller shaft assembly 16 which has an extension shaft 16a in turn connected to a liquid friction or viscous coupling 17 via a connection to be explained below. A longitudinal rearward propeller shaft portion 18, in the form of a hollow cylindrical shell or tubular member, has its forward end connected to the output of the viscous coupling 17. The aft end of the hollow propeller shaft tubular member 18 is suitably connected to a free-wheel or overrunning clutch, generally indicated at 19. The overrunning clutch 19 is, in turn, connected to rear axle 20 of the vehicle.

The rear axle 20 is thus driven from the front axle differential 13 via the front right-angle drive 15, the angled forward propeller shaft assembly 16, the liquid friction coupling 17, the longitudinal propeller shaft tubular member 18 and the overrunning clutch 19, which is coupled to the rear axle drive 20. The rear axle drive 20 comprises a right-angle drive 21, including an input bevel gear 21a and an output bevel gear 21b, together with a rear axle bevel gear differential 22. It will be noted that the differential 22 has its center aligned on the longitudinal centerline 22a of the vehicle.

A housing 23 is provided for the rear axle drive 21, 22 and is shown in FIG. 1 carrying a forward protruding tubular neck portion 24, to which an oil-tight housing 25 enclosing the overrunning clutch 19 is flange-mounted. The overrunning clutch 19 is adapted to be locked for the transmission of torque during normal driving and unlocked upon braking to prevent a decrease in the rotational speed of the vehicle front wheels from being transmitted to the rear wheels through the drive line connection therebetween. The overrunning clutch 19 comprises a dog clutch plate 26 (FIG. 2) having a sleeve portion 27 formed with internal splines 28 non-rotatably engaging external splines 29 on rigid clutch input spindle 18a. It will be noted that the clutch input spindle 18a forward end is received in the aft end of hollow propeller shaft member 18 and is welded thereto at 18c.

An external fork sleeve 30, concentrically surrounding the splined sleeve portion 27, has fore 31 and aft 32 sets of ball bearings captured thereon adapted to engage corresponding fore and aft counterbored ends 33 and 34, respectively, in external fork sleeve 30. Fork means, partially shown at 35, is suitably operated by remote control means (not shown) to axially shift the fork sleeve 30 fore and aft. Upon the fork sleeve 30 being moved rearwardly from its disengaged position of FIG. 2 the dog clutch plate 26 positively engages forwardly facing clutch teeth 36 on overrunning clutch outer race 38 achieving positive lock-up of the outer race 38 with the overrunning clutch input spindle defining propeller shaft portion 18a. The clutch outer race 38 is splined to clutch output propeller shaft portion 18b, shown coaxially aligned with clutch input shaft 18a. The propeller shaft portion 18b has its aft end fixed to input bevel gear 21a of rear angle drive 21.

Figure 2:
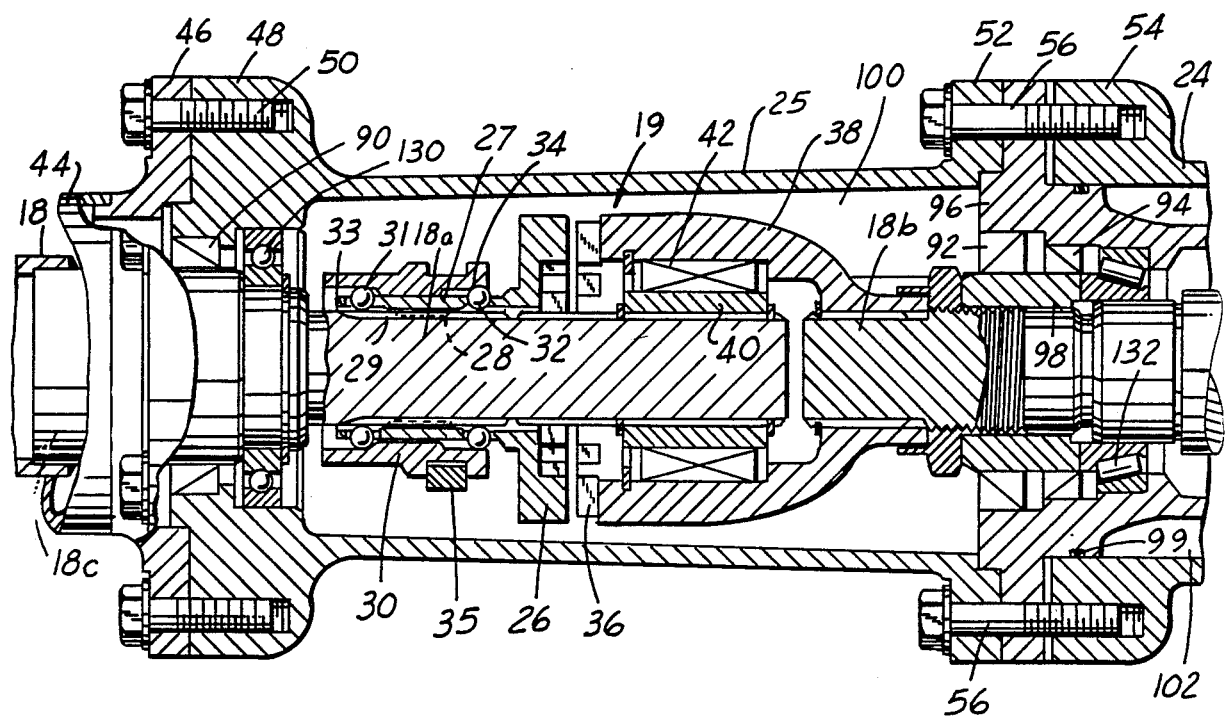
FIG. 2 is an enlarged axial sectional view showing the overrunning clutch, which is disposed intermediate the drive shaft extended torque tube and the neck portion of the rear axle drive housing.

The overrunning clutch 19 as seen in FIG. 2 is a sprag or cam type having an inner race 40 non-rotatably splined to the rigid shaft 18. Sprags 42 are shown mounted between the two circular outer 38 and inner 40 races so that rotation of the outer drive race 38 in the desired direction wedges the sprags 42 between the two races thus preventing their relative rotation. Reverse rotation of the races rocks the sprags 42 out of engagement allowing the races to rotate relative to one another.

Figure 3:
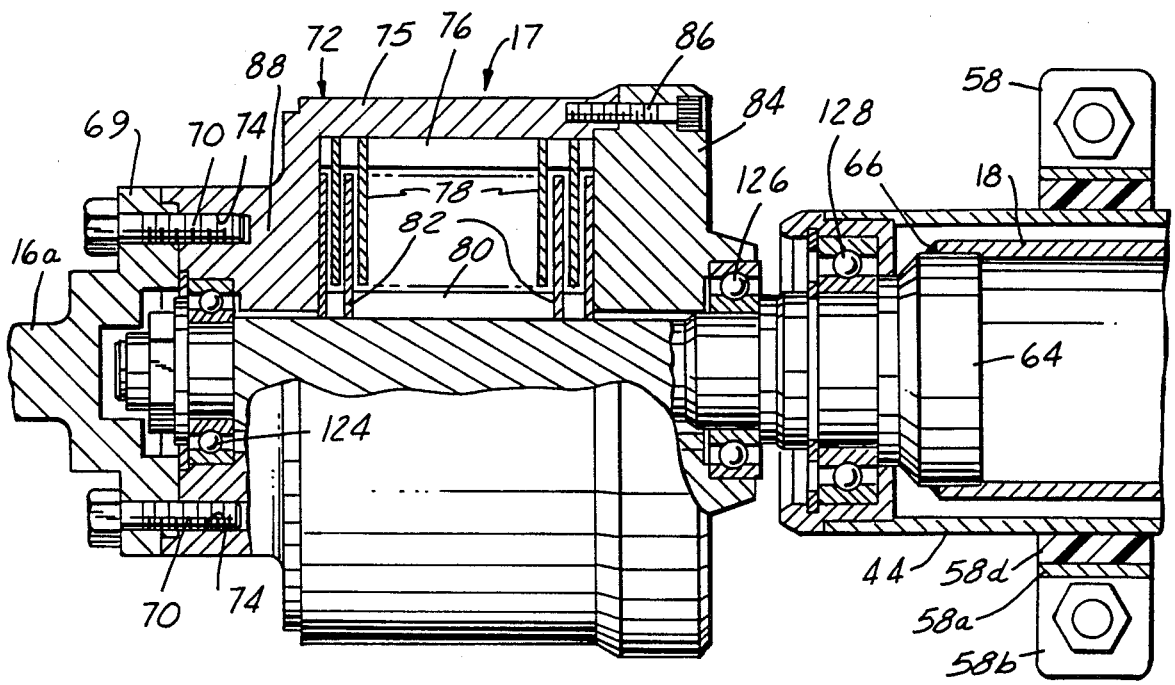
FIG. 3 is an enlarged partial sectional view showing the forward end portion of the drive shaft torque tube together with the viscous coupling.

As seen in FIGS. 1–3 the power train propeller shaft portion 18 is surrounded by a longitudinal extended torque tube 44, which torque tube 44 is rigidly connected to the clutch oil-tight housing 25. The housing 25, shown in FIG. 2 sealingly enclosing the overrunning clutch 19, is connected to torque tube 44 by means of torque tube aft radial flange 46 abutting housing 25 forward radial flange 48. The radial flanges 46 and 48 are suitably fastened thereto as by machine bolts 50. The housing 25 aft end has a radial flange 52 abutting forward radial flange 54 of the rear axle housing neck portion 24. Flange 52 is suitably fastened to neck portion flange 54 by machine bolts 56.

As best seen in FIGS. 6 and 7 the longitudinal composite torque tube assembly 24, 25 and 44 is rigidly connected adjacent its front end by a forward resilient isolation bearing bracket, generally indicated at 58, to a frame crossbeam 60. The bearing bracket 58 comprises a hat-shaped metal clamp 58a having its foot portions 58b fixed to the crossbeam 60 by bolts 58c. The clamp 58a captures an elastomeric ring 58d which snugly surrounds the torque tube 44 such that the composite torque tube assembly 24, 25, and 44 is resiliently isolated from the crossbeam 60. The crossbeam 60 has its ends suitably affixed, as by welding, to the longitudinal side rails 59 of the vehicle frame 62.

FIG. 3 shows the forward end of the hollow propeller drive shell member 18 surrounding and fixedly connected to output spindle shaft 64 of the viscous coupling 17 such as by peripheral weld 66. The universal-joint drive shaft assembly extension shaft 16a of the vehicle drive train includes a radial flange 69. The radial flange 69 is shown in FIG. 3 fixed by machine bolts 70 to housing 72 of the liquid friction coupling 17. The machine bolts 70 are threaded into housing tapped bores 74.

The viscous coupling housing 72 cylindrical outwardly spaced cylindrical drum portion 75 has internal splines 76 drivingly mounting a plurality of first outer viscous coupling plates 78. The viscous coupling output spindle 64 has external splines 80 drivingly mounting a plurality of second inner viscous mounting plates 82 interleaved with the first plates 78. The plates 78 and 82 shown herein may be similar to the plates depicted and described in U.S. Pat. Nos. 3,760,922 and 4,031,780. It will be understood, however, that plates with other configurations may be used. An aft end wall portion in the form of cover member 84 closes the aft end of the viscous coupling housing 70 and is secured by machine bolts 86. A forward integral end wall portion 88 of the housing defines a forward hub portion.

With reference to FIG. 2 it will be seen that the overrunning clutch housing 25 has a forward hydraulic seal 90 surrounding the input spindle portion 18a and a pair of hydraulic seals 92 and 94 interposed between an intermediate bearing support jacket 96 and an inner bearing collar 98. An O-ring resilient seal 99 is shown at the juncture of the rear differential housing neck portion flange 54 and the bearing support jacket 96. In this way the overrunning clutch 19 is supported in an oil tight housing chamber 100 allowing the use of specific suitable lubricants for rear drive axle housing chamber 102 and the chamber 100.

With reference to FIGS. 4 and 5 it will be seen that the rear axle drive housing 13 is resiliently supported or sprung from crossbeam 104 of the vehicle frame 62 by a pair of identical transversely spaced isolation mounts 105 and 106. Each of the mounts 105 and 106 comprises upper and lower rubber pads 107 and 108 respectively, clamped to a support flange 109 by a machine bolt 110. The centers of the mounts 105 and 106 are transversely aligned on section-line 5—5 and symmetrically spaced a predetermined equal distance "D" on either side of the torque tube 44 principal centerline 111. As seen in FIG. 6 the mounts 105 and 106 have their centers spaced a predetermined longitudinal distance "L" from the resilient torque tube bracket 58. In the disclosed form of the invention the distance "L" is at least one-quarter of the distance between the rotational axis of the front 112 and rear 114 drive wheels.

FIGS. 1 and 4 show the vehicle being provided with a relatively large fuel tank indicated at 116. It will be appreciated that the off-center positioning of the propeller shaft 18 and torque tube 44 allows for a larger capacity fuel tank 84

It will be seen in FIG. 1 that the forward propeller shaft 16 is connected at its aft end to shaft portion 16a by a universal joint 120. The front end of the shaft 16 is coupled to transaxle gear shaft 15c by a plunger-type universal joint 122. The universal joints 120 and 122 function to allow the sprung composite torque tube assembly 24, 25, and 44 and rear axle drive housing 13 to freely pivot in a vertical plane about the transverse centers of the isolation mounts 105 and 106 in response to the reaction drive torque of the rear axle pinion gear 21a.

With reference to FIG. 3 it will be seen that the viscous coupling housing forward end wall 88 is journally supported on the output spindle 64 by a ball bearing unit 124. A ball bearing unit 126 journally supports the aft end wall portion or cap 84. The aft end of the output spindle is concentrically received in the forward end of the torque tube 44 and is journally supported therein by a ball bearing unit 128.

It will be noted in FIG. 2 that the overrunning clutch input spindle 18a is journally supported by ball bearing unit 130 in the housing 25. Further, the overrunning clutch output spindle 18b is journally supported by roller bearing unit 132 in the support jacket 96.

While the principles of the invention in connection with the specific apparatus has been described, it is to be understood that the foregoing detailed description has been made by way of example only and not as a limitation to the scope of the invention as set forth in the accompanying claims.

What is claimed is:

1. In a motor vehicle comprising a front axle with front wheels having a front axle drive, front engine means for permanently driving said front axle, rear axle means drivingly connected to a pair of rear wheels, a rear axle drive housing enclosing a right-angle drive adapted for driving a rear differential connected to said rear axle means, a vehicle frame supported by said front axle and said rear axle means, and power-transmitting means for selectively driving said right-angle drive, said power-transmitting means comprising longitudinal propeller drive shaft means, a viscous coupling connected between said front engine means and said rear axle drive housing, and an overrunning clutch connected in said propeller drive shaft means with means for locking said clutch for transmission of torque therethrough, the improvement wherein:

said propeller shaft drive means comprising a forward universal-joint angled shaft assembly and a rearward propeller shaft assembly aligned on longitudinal axis of said vehicle frame, said overrunning clutch enclosed in an oil-tight cylindrical housing having its aft end rigidly connected to a front end of a forwardly extending tubular neck portion integral with said rear axle drive housing, said clutch housing having its front end flange-mounted to an aft end of an elongated torque tube so as to be aligned on said longitudinal axis, said torque tube having a forward portion secured by a resilient forward isolation bracket to said vehicle frame;

said rear axle drive housing resiliently sprung from said vehicle frame by a pair of isolation mounts aligned on a transverse axis, whereby said rear axle drive housing tubular neck portion, said overrunning clutch housing and said torque tube comprise a composite extended torque tube assembly operative as a lever arm which pivots in a vertical plane about said transverse axis in response to reaction torques imparted from said right-angle drive;

and said rearward propeller shaft assembly including an inner hollow sleeve concentrically supported within said torque tube having its front end fixedly connected to an aft end of an output spindle shaft of said viscous coupling, said viscous coupling having a cylindrical outer drum portion concentrically spaced outward from said output spindle shafts between axially spaced constant diameter forward and aft drum end wall sections defining a viscous chamber with said spindle, each said forward and aft drum end wall section journally supported on said output spindle shaft, said output spindle shaft having its aft end journally supported within said torque tube forward end, and said viscous coupling drum forward end wall section fixedly connected to an aft end of said forward universal-joint propeller shaft assembly;

whereby reaction torque vibrations imparted by said rear axle drive housing and said composite torque tube assembly to said forward resilient support bracket resulting in oscillation of said composite torque tube assembly about said transverse axis of said rear isolation mounts will be effectively dampened by virtue of said composite torque tube assembly resilient forward isolation bracket being located at a predetermined extended distance from said transverse axis of said rear isolation mounts equal to least one-quarter of the wheel-base distance of said vehicle.

* * * * *